Aug. 3, 1965     F. T. GARNER     3,198,551
PUSHER VEHICLE

Filed March 27, 1961     3 Sheets-Sheet 1

INVENTOR.
Fay Troy Garner
BY
Hovey, Schmidt, Johnson & Hovey
ATTORNEYS.

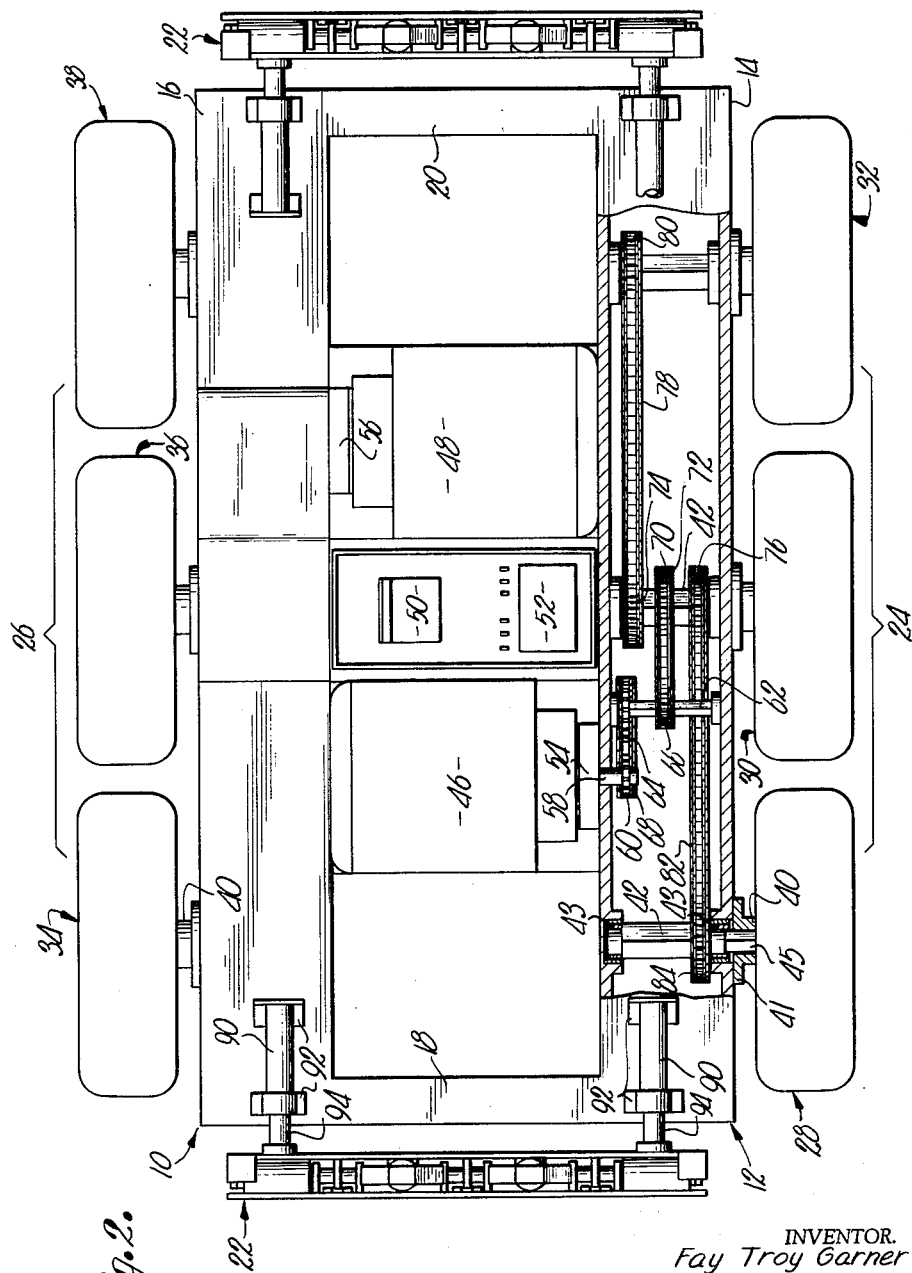

Aug. 3, 1965    F. T. GARNER    3,198,551
PUSHER VEHICLE
Filed March 27, 1961    3 Sheets-Sheet 3
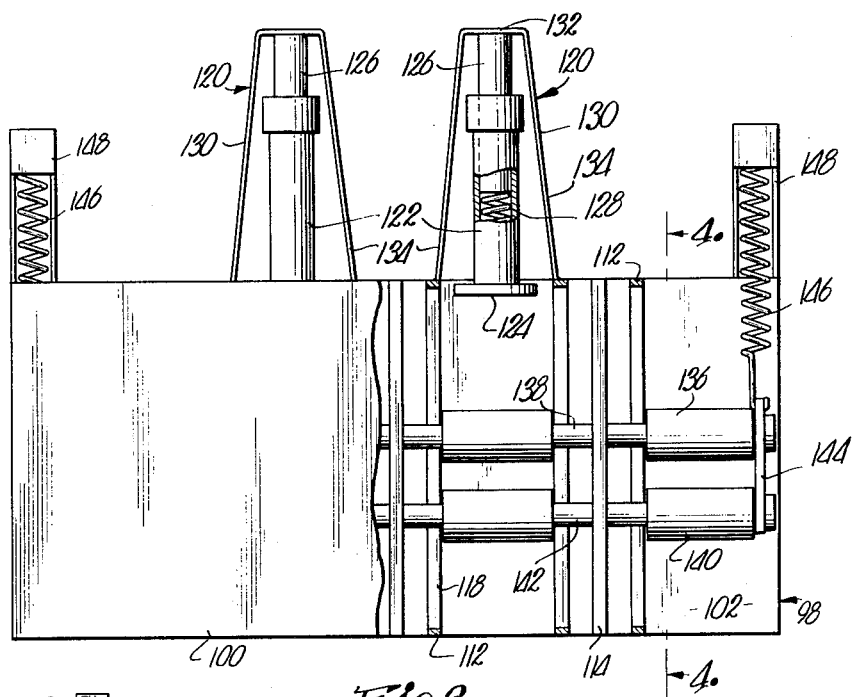
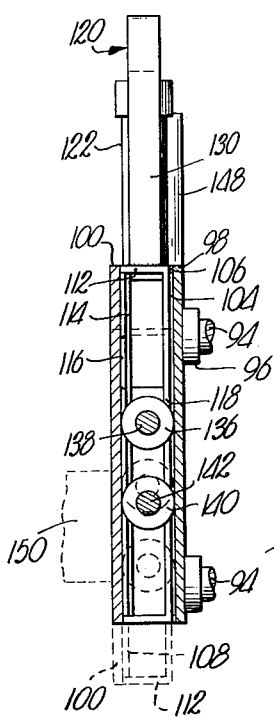
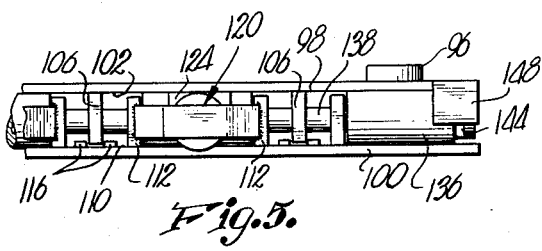
INVENTOR.
Fay Troy Garner
BY
*Hovey, Schmidt, Johnson & Hovey*
ATTORNEYS.

United States Patent Office 3,198,551
Patented Aug. 3, 1965

3,198,551
PUSHER VEHICLE
Fay Troy Garner, Rte. 2, Box 136, Greeley, Colo.
Filed Mar. 27, 1961, Ser. No. 98,690
6 Claims. (Cl. 280—481)

This invention relates to vehicles used in earth moving and construction and more particularly to a traction vehicle adapted to push other pieces of large earth moving equipment or the like.

It is the most important object of this invention to provide a pusher vehicle having a set of supporting and driving wheels on each side of the longitudinal axis of the vehicle, the wheels of each set being interconnected in such a manner that they may be driven in unison by a single power source, there being a power source provided for each set of wheels whereby each of the sets may be driven independently of the other.

A yet further aim of this invention is to provide a pusher vehicle having mounted at one or both ends thereof a pusher plate assembly which is adapted to be brought into engagement with a rearward projection normally provided on earth moving, earth scraping, earth scarifying equipment and the like, commonly known as a "stinger," whereby the pusher vehicle, through the aforementioned pusher plate assembly may supplement the ordinary power source used for driving such equipment, which power source is, in many instances, insufficient to transport the earth moving equipment as the same is being used or subsequent to the loading thereof.

Another aim of this invention is to provide a pusher plate assembly adapted to be mounted upon a pusher vehicle such as above described, which pusher plate assembly has a first plate mounted upon an end of the vehicle for reciprocable movement with respect thereto and a second plate carried by the first plate in substantially parallel relationship thereto, the second plate being vertically shiftable whereby it may accommodate itself to the position and location of the stinger which it engages and allow the maximum force of the pusher vehicle to be exerted upon the vehicle or equipment being pushed.

Other objects of this invention include the power train assembly which is utilized to simultaneously drive the wheels comprising a set; the method of mounting the pusher plate assembly upon the frame of the pusher vehicle; and details of construction of the pusher plate assembly, all of which will become apparent from the following specification and accompanying drawing, wherein:

FIG. 2 is a top plan view of the pusher vehicle, parts being broken away to reveal details of construction;

FIG. 3 is a front elevational view of the pusher plate assembly, parts being broken away and in section;

FIG. 4 is a sectional view taken on line 4—4 of FIG. 3; and

FIG. 5 is a fragmentary top plan view of the pusher plate assembly.

Figure 1:
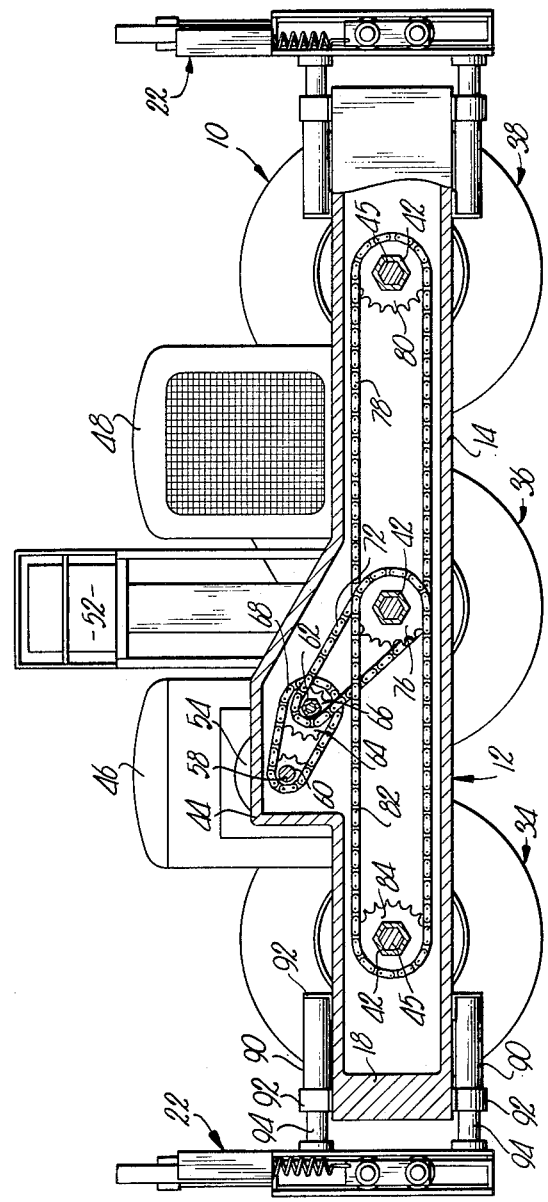
FIGURE 1 is a side elevational view of the pusher vehicle, parts being broken away to reveal details of construction.

The pusher vehicle forming the subject of this invention is broadly designated by the numeral 10 and comprises a substantially rectangular frame 12 having side members 14 and 16 and end members 18 and 20 disposed transversely to side members 14 and 16.

For purposes of illustration a pusher plate assembly 22 has been shown attached to each of frame 12 but it will be appreciated that either one or two such assemblies may be used at the option of the seller or user of vehicle 10.

Each of side members 14 and 16 has mounted thereupon a set of wheels 24 and 26 respectively, each set 24 and 26 consisting, in the embodiment chosen for illustration, of three wheel and axle assemblies. The wheel and axle assemblies constituting set 24 are designated as 28, 30 and 32 and the wheel and axle assemblies constituting set 26 are designated as 34, 36 and 38.

The manner of mounting assemblies 28-38 upon their respective side members is best illustrated in FIG. 2 with particular reference being made to the showing of assembly 28, which showing depicts the manner in which all of the assemblies 28-38 are carried by the frame 12.

Each wheel of each assembly is mounted upon its corresponding side member 14 or 16 by means of a spindle 40, the spindle 40 carrying the wheel at the outermost end thereof and having a flanged portion 41 at its innermost end, said portion 41 being suitably secured to the corresponding side member. Carried within the hub of each wheel is a planetary gear assembly (not shown) for a purpose which will be hereinafter described.

A sleeve 42 is carried by frame 12 for each wheel, the sleeves 42 being of hexagonal inner and outer configuration as best seen in FIG. 1. Sleeves 42 are rotatably mounted between the upright plates which form a part of each of the side members 14 and 16, by means of bearings 43 disposed at each end of sleeve 42. In this respect it should be noted that each of side members 14 and 16 takes the form of an elongated hollow chamber having an upwardly extending housing 44, the chamber and the housing being closed and filled with a suitable lubricant for the moving parts disposed therewithin.

The spindle 40 and sleeve 42 receive therewith an elongated, hexagonal axle 45 which serves to transmit the rotative motion supplied to sleeve 42 to the corresponding wheel inasmuch as the outer end of axle 45 is coupled, through a hexagonal fitting, with the planetary gear assembly in the hub of the wheel. Thus when power is directed to sleeve 42 to rotate the same, axle 45, by virtue of its tight, hexagonal fitting within sleeve 42, is rotated and this motion is transmitted to the planetary gear assembly within the hub of the wheel whereby to rotate the wheel. With the foregoing arrangement there is no direct load upon the axle 45 and the same is in effect, free floating, whereby to reduce the strain thereupon and further to allow easy removal thereof.

Frame 12 has mounted thereupon, in a position between members 14 and 16, a pair of motors 46 and 48, an operator's seat 50 and a suitable control panel designated generally as 52, the control panel 52 containing suitable connections whereby motors 46 and 48 may be operated as well as brakes 54 and 56 which are operably associated with the driving shafts of motors 46 and 48 respectively.

Each of motors 46 and 48 has a driving shaft which extends into the corresponding side members, the driving shaft of motor 46 being designated as 58. Shaft 58 of motor 46 carries a relatively small sprocket wheel 60 which is keyed to shaft 58 and rotates therewith at a speed determined by the speed of motor 46. Within the chamber defined by housing 44 there is provided a shaft 62 which is rotatably carried between the walls of housing 44. Shaft 62 has a relatively large sprocket wheel 64 fixedly secured thereto, preferably by a hexagonal fit, and a second sprocket wheel 66 likewise secured thereto adjacent first sprocket wheel 64. Shaft 62 is driven from motor shaft 58 by means of a chain 68 which is trained over and interconnects sprocket wheel 60 on shaft 58 and sprocket wheel 64 on shaft 62. Power thus delivered to shaft 62 is transmitted to sprocket wheel 66 also carried by shaft 62 and is then delivered to assembly 30 of set 24 by means of a sprocket 70 which is fitted over sleeve 42 of assembly 30 within the chamber defined by side member 14, said sprocket 70 and sprocket 66 being interconnected by a chain 72. Thus as shaft 58 is driven by motor 46 power and movement are transmitted to sleeve 42 of assembly 30 which, in the form shown, constitutes the center wheel and axle assembly of set 24, this power and movement being in turn transmitted to the wheel of assembly 30 through axle 45 as hereinabove described.

Sleeve 42 of assembly 30 also has suitably affixed thereto, preferably by hexagonal fittings, an innermost sprocket 74 and an outermost sprocket 76. Inner sprocket 74 operably couples assembly 30 with assembly 32 by means of chain 78 and sprocket wheel 80, the latter being secured to sleeve 42 of assembly 32. Likewise assembly 30 is operably interconnected to assembly 28 through chain 82 and sprocket wheel 84, the latter being secured to sleeve 42 of assembly 28.

The foregoing construction allows wheel and axle assemblies 28, 30 and 32 of set 24 to be driven simultaneously and in unison through the operation of motor 46 inasmuch as said motor drives, through the chain and sprocket assembly above described, assembly 30, the rotation of assembly 30 and its associated parts causing the simultaneous rotation of assemblies 28 and 32 which are interconnected with assembly 30 by the chain and sprocket assemblies as above described. Inasmuch as the power train assembly used to drive wheel and axle assemblies 34, 36 and 38 of set 26 is the same as that above described and provided for set 24, it will be appreciated that the wheels of set 26 can likewise be driven in unison through the actuation of motor 48. Thus each of sets 24 and 26 can be driven independently of the other set, the wheels of each set being driven in unison. Such simultaneous driving of the wheels constituting each set precludes slippage of one of the wheels and gives steady and continuous driving support to the pusher vehicle 10. Further, if one of the wheels of a set should drop in a hole the remaining wheels of the set would provide continued traction for the vehicle. It should also be noted that in order to provide steady support and continuous traction as above described the wheels of each set should be positioned as closely together as is possible.

Steering of pusher vehicle 10 is accomplished by varying or reversing the speed of motors 46 and 48 and through driving sets 24 and 26 at different speeds whereby the vehicle can be caused to turn in any direction desired. Further it will be appreciated that one set of wheels may be driven while the other is held motionless through the selective operation of either brake 54 or 56 as may be desired.

The pusher plate assemblies hereinabove designated as 22 may be carried by either one or both ends of vehicle 10 and inasmuch as such assemblies would be identical in construction only one will be hereafter described.

As shown in FIGS. 1 and 2 assembly 22 is intended to be mounted upon frame 12 adjacent one end thereof and in substantially parallel relationship to the end chosen for such mounting.

Assembly 22 is mounted upon frame 12 by means of piston and cylinder assemblies 90, there normally being four of such assemblies used to mount the pusher plate assembly 22. A pair of assemblies 90 are mounted on each of side members 14 and 16 of frame 12, one assembly of each pair being on the uppermost surface of the corresponding side member and the other assembly 90 of said pair being disposed upon the lowermost surface of the side member. Assemblies 90 are retained in position by mounting blocks 92 and are located in such a manner that the piston 94 of each of the assemblies 90 extends beyond the end of the vehicle upon which assemblies are mounted. Pistons 94 reciprocate within their corresponding cylinders and are normally urged outwardly by a spring disposed within the cylinder and rearwardly of the piston as well as by a compressable fluid which is likewise retained within the cylinder and behind the piston. The outermost, free ends of pistons 94 are received within and secured to corresponding sleeves 96 which are carried by a first plate 98 of assembly 22. Thus pistons 94, through their engagement with sleeves 96 serve to support plate 98 in a vertical position substantially parallel with the end of the vehicle 10 upon which assembly 22 is mounted.

Pusher plate assembly 22 includes a second plate 100 which is disposed in a substantially vertical position and in parallel relationship to plate 98. Plate 98 has secured to the innermost face 102 thereof a plurality of guide bars 104, which guide bars 104 extend transversely of plate 98 and run the full width thereof. Guide bars 104 have, at each end thereof, lateral extensions 106, which extensions 106 are perpendicular to bars 104 and substantially span the distance between spaced-apart plates 98 and 100. Plate 100 likewise has secured thereto a plurality of guide bars 108, which bars are affixed to the inner surface 110 of plate 100 and have lateral extensions 112 at each end thereof which extensions 112 are perpendicular to bars 108 and substantially span the distance between the inner face 102 of plate 98 and the inner face 110 of plate 100.

The ends of lateral extensions 106 of bars 104 are interconnected by additional bars 114 whereby to substantially define a rectangular frame which is carried by first plate 98. Said interconnecting bars 114 are disposed between guide strips such as 116 which are secured to surface 110 and which provide means for retaining plate 100 in its position relative to plate 98 as forces are brought to bear upon plate 100 and also serve to prevent lateral displacement of said plate 100.

The ends of lateral extensions 112 are likewise interconnected by bars 118 whereby to define substantially rectangular frame which is carried by inner face 110 of plate 100. Thus each of plates 98 and 100 has secured to the inner face thereof a plurality of substantially rectangular frames formed from the bars above described, the frames which are secured to the plate 98 remaining fixed therewith and the frames which are secured to the plate 100 being allowed to shift vertically therewith.

Plates 98 and 100 are interconnected by units 120, two of such units being shown for purposes of illustration. Units 120 include a cylinder 122 mounted uprightly on a bracket 124, which bracket 124 is secured to inner face 102 of plate 98. Cylinder 122 slidably receives a piston 126, the piston 126 being supported in a normal, predetermined position by a coil spring 128, which coil spring 128 is secured at its lowermost end to cylinder 122 and at its uppermost end to the inner end of piston 126. A U-shaped bracket 130 has its bight portion 132 suitably secured to the outer end of piston 126, and its legs 134 secured, at their lowermost ends, to corresponding extensions 112 of a pair of bars 108. Such construction allows plate 100 to shift vertically with respect to plate 98, the units 120 serving to return plate 100 to its normal position with respect to plate 98 when the pusher plate assembly 22 is not in use. Thus as plate 100 moves upwardly with respect to plate 98, to which cylinder 122 is secured by bracket 124 the movement of piston 126, which is secured to plate 100 through bracket 130 will extend spring 128 and when the upwardly moving force on plate 100 is released the spring 128 in returning to its normal position will exert a downward pull on piston 126 and thus move plate 100 to its predetermined normal position. Likewise when plate 100 is moved downwardly spring 128 will be compressed but when the downward pressure is removed from plate 100 the expansion of the spring 128 will force piston 126 upwardly thereby returning plate 100 to its predetermined normal position.

To facilitate the shifting movement of plate 100 with respect to plate 98 a plurality of rollers are provided, such rollers, in the form chosen for illustration, comprising a first series 136 carried by shaft 138 and a second series 140 carried by shaft 142. Shafts 138 and 142 are disposed in substantially parallel relationship between plates 98 and 100 and extend longitudinally thereof for the full length of each of said plates. Shafts 138 and 142 are interconnected at each end thereof by connecting plate 144, which serves to maintain said shafts 138 and 142 and the rollers carried thereby in spaced vertical relationship. Plates 144 are interconnected to plate 98 through coil springs 146 which are connected, at their lowermost ends to plates 144 and at their uppermost ends to a housing 148 carried by plate 98. As is further apparent from FIG. 3 the rollers 136 and 140 engage inner faces 102 and 110 respectively and are retained in position with respect thereto by means of the rectangular frame assemblies which are secured to each of said surfaces and which have been hereinabove described. Thus the bars such as 104, 108, 114 and 118 cooperate to form trackways within which rollers 136 and 140 may move as plate 100 is shifted vertically with respect to plate 98. It will also be appreciated that lateral extensions 106 and 112 limit the extent of vertical movement of shafts 138 and 142 and thereby prevent said shafts and their associated rollers 136 and 140 from becoming displaced from between plates 98 and 100. Additionally springs 146 serve to urge shafts 138 and 142 and the rollers carried thereby to a normally central position between plates 98 and 100 and will return said shafts and rollers to this position after they have been forced downwardly through the movement of plate 100.

As is apparent from the above defined construction of the pusher plate assembly 22 several relative movements may occur when the assembly 22 is brought into engagement with the projection or "stinger" 150 of a piece of earth moving equipment. Initially the spring and fluid in piston and cylinder assemblies 90 will be slowly compressed whereby plate 98 may move into engagement with the adjacent front surface of the frame member upon which assembly 22 is positioned. Once this has occurred and if power is applied to vehicle 10 to push the earth moving equipment through projection 150, plate 100 of assembly 22 is free to shift vertically whereby to accommodate itself to the level and position of projection 150, thus allowing a maximum application of pushing pressure from vehicle 10 through pusher plate assembly 22 to the piece of equipment being pushed by said vehicle 10. Once the pushing operation has been completed plate 100 is disengaged from projection 150 and is returned to its normal position as has been described and likewise the expansion of the spring and fluid within the piston and cylinder assemblies 90 will return the pusher plate assembly 22 to its normal position with respect to frame 12 of vehicle 10.

Having thus described the invention what is claimed as new and desired to be secured by Letters Patent is:

1. A pusher plate assembly adapted for attachment to a traction vehicle comprising a first plate normally disposed in a vertical position; a second plate spaced from said first plate and normally disposed in substantially parallel relationship thereto; means interconnecting said first and second plates whereby said second plate is vertically shiftable with respect to said first plate in a plane parallel to and spaced from said first plate, said interconnecting means comprising a vertically disposed piston and cylinder assembly carried by said first plate and a bracket interconnecting said piston with the second plate; and means disposed between said first and second plates to maintain the same in spaced relation and facilitate the movement of said second plate with respect to said first plate.

2. A pusher plate assembly as set forth in claim 1, said last named means being rollers provided between said first and second plates to maintain the same in spaced relation and facilitate the movement of said second plate with respect to said first plate.

3. A pusher plate assembly as set forth in claim 2 wherein said rollers are mounted on shafts, there being resilient means interconnecting said shafts with said first plate whereby to maintain said rollers disposed between said plates.

4. A pusher plate assembly adapted for attachment to a traction vehicle comprising a first plate normally disposed in a vertical position; a second plate spaced from said first plate and normally disposed in substantially parallel relationship thereto; at least one piston and cylinder assembly carried uprightly by said first plate; a U-shaped bracket having the legs thereof secured to the second plate and the bight portion thereof secured to said piston whereby the second plate is shiftably interconnected to the first plate; a plurality of rollers disposed between said plates for movement in a vertical path; shafts for said rollers; and resilient means interconnecting said shafts with said first plate.

5. A pusher plate assembly as set forth in claim 4 there being guide bars secured to the inner faces of each of said plates whereby to define the path of vertical movement of said rollers and limit lateral displacement thereof.

6. A pusher plate assembly as set forth in claim 5 wherein said guide bars have lateral extensions which substantially span the distance between said plates whereby to prevent said rollers from moving from between said plates.

References Cited by the Examiner

UNITED STATES PATENTS

| | | | |
|---|---|---|---|
| 1,121,346 | 12/14 | Gates | 180—83 |
| 1,135,066 | 4/15 | Sonnichsen | 293—86 |
| 1,430,251 | 9/22 | Parker | 180—6.48 |
| 1,642,879 | 9/27 | Icre | 180—83 |
| 2,247,664 | 7/41 | Osman | 280—481 |
| 2,372,585 | 3/45 | Klumb et al. | 254—26 X |
| 2,808,117 | 10/57 | Garrett | 180—6.48 |
| 2,919,142 | 12/59 | Winget | 280—481 |
| 2,999,697 | 9/61 | Winget | 280—481 |

FOREIGN PATENTS 1,097,463   1/61   Germany.

A. HARRY LEVY, *Primary Examiner.*

PHILIP ARNOLD, LEO FRIAGLIA, *Examiners.*